United States Patent [19]
Blower et al.

[11] 3,850,265
[45] Nov. 26, 1974

[54] LUBRICATING DEVICE

[75] Inventors: Warren A. Blower, Brecksville; Allen R. Scott, Parma Heights, both of Ohio

[73] Assignee: The Sherwin-Williams Company, Cleveland, Ohio

[22] Filed: Aug. 21, 1970

[21] Appl. No.: 65,904

[52] U.S. Cl............. 184/7 D, 251/61.1, 137/612.1
[51] Int. Cl............................................... F16n 7/30
[58] Field of Search.......... 184/7 D, 7, 7 E, 7 F, 39, 184/81; 222/334, 386.5; 137/608, 612.1; 251/61.1

[56] References Cited
UNITED STATES PATENTS

| | | | |
|---|---|---|---|
| 2,677,390 | 5/1954 | Davis et al. | 251/61.1 X |
| 2,845,142 | 7/1958 | Schneller | 184/7 D |
| 2,848,067 | 8/1958 | Schneller | 184/7 D |
| 2,903,015 | 9/1959 | Erwin | 137/612.1 X |
| 3,051,263 | 8/1962 | McKenzie | 184/7 D |

*Primary Examiner*—Manuel A. Antonakas
*Attorney, Agent, or Firm*—Donnelly, Maky, Renner & Otto

[57] ABSTRACT

A lubricating device for foundry molding machines and the like which includes a distributor valve having an air operated diaphragm operative on each cycle of the machine to force a measured quantity of lubricant to each of a plurality of machine components requiring lubrication.

9 Claims, 4 Drawing Figures

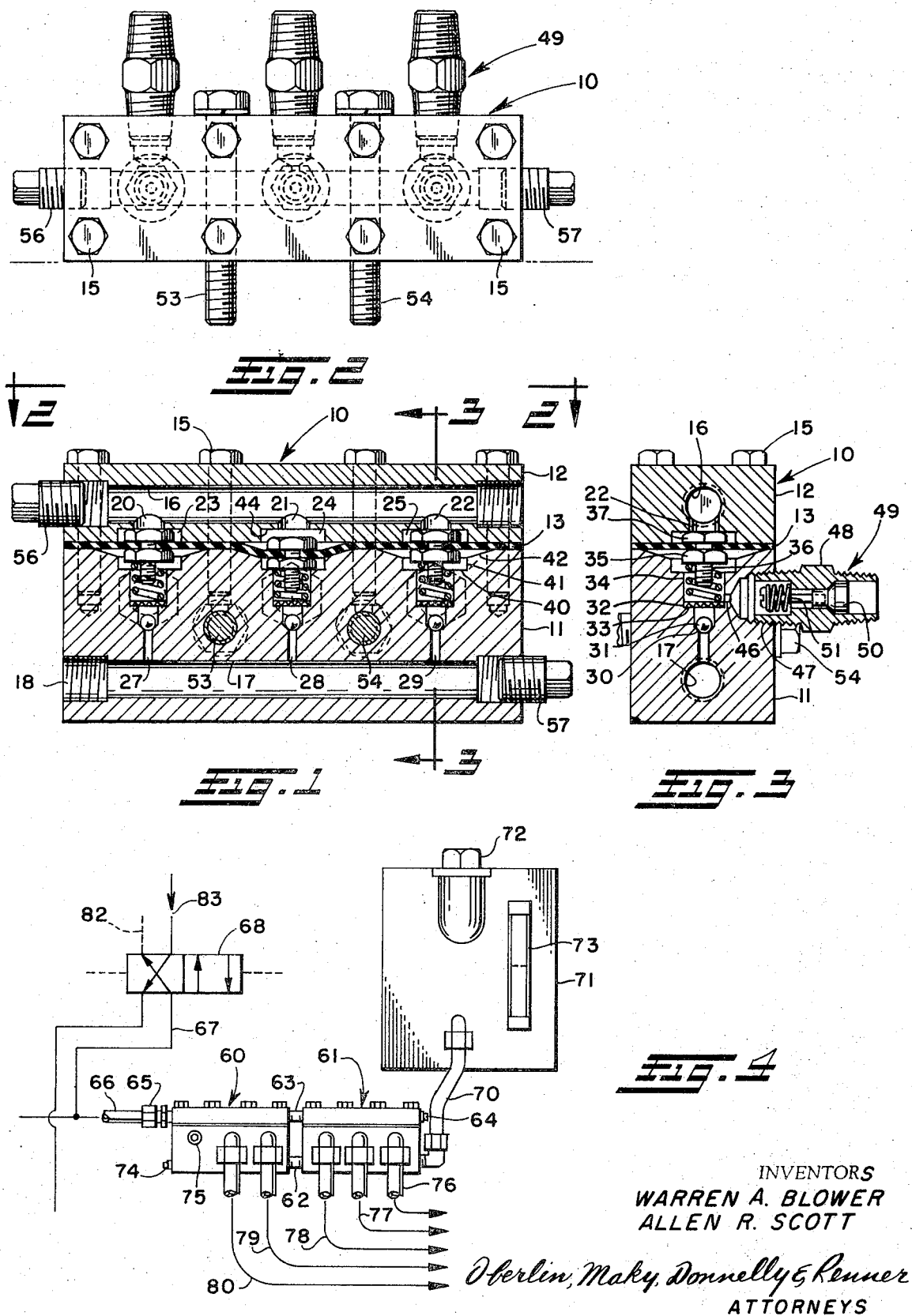

LUBRICATING DEVICE

This invention relates generally as indicated to a lubricating device and more particularly for a lubricating device finding particular utility in machines operating in dirty environments.

Conventional lubricating systems generally employ metering or distributing valves using reciprocating plungers, such plungers moving in carefully machined and polished cylindrical chambers.

Such lubricating devices are inherently costly because of the required care in fabrication and when used on machines wherein contaminants abound faulty operation can be distressingly frequent. Needless to say, if a lubrication device fails to operate and the malfunction remains unnoticed, severe damage to the machine may result.

It is therefore a principal object of the present invention to provide a lubricating device of simplified and economical construction.

Another important object is the provision of a lubricating device which will continue to operate regardless of contaminants in the lubricant or air.

Another object is the provision of a lubricating device finding particular utility in foundry molding machines.

A further object is the provision of a lubricating device utilizing a diaphragm cyclically to force lubricant to the various components of the machine.

A still further object is the provision of a distributor valve wherein a single diaphragm may be employed to force a measured amount of lubricant to a plurality of machine components.

Yet another object is the provision of a lubricating device for machinery which does not require the reciprocating plungers moving in close tolerance with cylindrical chambers.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

In said annexed drawing:

FIG. 1 is a vertical section of a lubricating distributor valve in accordance with the present invention;

FIG. 2 is a top plan view of the valve of FIG. 1 taken from the line 2—2 of FIG. 1;

FIG. 3 is a vertical section taken substantially on the line 3—3 of FIG. 1; and

FIG. 4 is a schematic illustration of the application of the distributor valve of FIGS. 1 through 3 to a machine such as a foundry molding machine.

Referring first to FIGS. 1 through 3, it will be seen that the lubricating distributor valve shown generally at 10 includes a valve body 11 and a valve cap 12 with diaphragm 13 therebetween. The cap, diaphragm, and body are secured together by the eight hex head cap screws indicated at 15.

The valve body and cap may be of the generally rectangular shape noted and both are provided with longitudinally extending passages seen at 16 and 17, respectively, each end of each passage terminating in a tapped port as seen at 18.

The longitudinally extending passage 16 of the cap 12 is provided with three equally spaced transverse branch passages 20, 21 and 22 which provide communication between the longitudinal passage 16 and chambers 23, 24 and 25, respectively. Such chambers are of slightly larger diameter than the transverse passages 20 through 22 and are exposed at the bottom surface of the cap 12 to the diaphragm 13 therebelow.

The longitudinal passage 17 in the body 11 has connected thereto three transverse passages 27, 28 and 29 which are aligned with the transverse passages 20, 21 and 22 in the cap. Each of the passages 27 through 29 is provided with a plurality of shoulders, the first indicated at 30 being a seat for ball 31. The ball 31 is retained between its seat 30 and screen 32 seated on the next adjacent shoulder 33. The enlarged portion of the passage above the screen houses a compression spring 34 which extends between the screen and hex nut 35. Such hex nut is threaded on cap screw 36 which extends through the diaphragm, the diaphragm being clamped between the hex nut 35 and the head 37 of the cap screw.

The shank of the cap screw 36 maintains the spring 34 centered within the enlarged portion of the passage above the screen 32. Each passage includes a further shoulder 40 providing a yet further enlarged portion 41 for each passage of the same diameter as the chambers 23 through 25 thereabove. The enlargements 41 terminate in outwardly flared wall 42 which permits the diaphragm to deflect downwardly as indicated by the center metering device which compresses the spring 34. It will be appreciated that the center metering device is depressed for purposes of illustration only since in normal operating manner each of the three metering devices will be operated simultaneously.

The construction of the chambers 23 through 25 and the passages 20 through 22 provides a top stop shoulder 44 which will engage the head 37 of each of the cap screws 36 limiting the extent to which the springs 34 may urge the diaphragm upwardly. In such stop or neutral condition, the diaphragm will be essentially planar. When air pressure is supplied to the passage 16 and thus the chambers 23 through 25, the diaphragms are distorted downwardly compressing the springs 34 until the nuts 35 engage the shoulders 40. Accordingly, the head of the cap screw and the nut between which the diaphragm is clamped engage the shoulders 44 and 40, respectively, limiting movement or distortion of the diaphragm.

Immediately above the screens 32 each of the passages 27 through 29 are provided with a horizontal branch passage seen at 46 which enlarges into tapped port 47 in which is mounted the body 48 of check valve 49. Each check valve includes a valve member or plunger 50 urged by spring 51 to its closed position in conventional manner.

The distributing valves may be mounted in any convenient location on the machine by the use of fasteners as indicated at 53 and 54. The body and cap may be machined from conventional metals such as steel or may be machined from transparent plastic to provide visual inspection of the interior. The diaphragm 13 is preferably Buna-N but may be Viton or other similar fluoroelastomer resistant to oils, grease and the like.

The lubricating distributor valve may be mounted in any convenient location on the machine with the one end of the longitudinal passage 16 in the cap 12 plugged as seen at 56. The opposite end may be connected by a suitable union to an air valve so that the passage will be periodically pressurized. Similarly, the one end of the passage 17 in the body 11 may be plugged as indicated at 57 and the opposite end may be connected to a source of lubricant or oil. It will then be seen that when the passage 16 is pressurized, the diaphragm will be depressed by air pressure in each of the chambers 23 through 25 as indicated for purposes of illustration adjacent the central chamber 24. Oil beneath the diaphragm will be caused to flow outwardly through check valve 49. When the air pressure in passage 16 is vented, the springs 34 will cause the diaphragm to return to its planar position drawing oil or lubricant through transverse passages 27 through 29 from the passage 17 into the chamber above the check balls 31.

The abutment between the cap screw head 37 or the hex nut 35 and the associated chamber shoulders limits the movement of the diaphragm both by air pressure and by the return spring 34. There is no external adjustment on the device which would permit an operator to make a mistake. If different capacities are desired by the lubricant metering device, it would normally be simply replaced by a distributor valve having larger or smaller chambers or strokes. As the passage 16 is pressurized, oil or lubricant is forced through the check valves 49 and as such line is vented, the springs 34 return the diaphragm to its planar position pumping lubricant or oil from the passage 17 through the check balls 31 into the oil or lubricant chambers beneath the diaphragm. Because of the construction of the device, it will be seen that dirt or contaminants, both in the air line or the oil or lubricant line, may readily be tolerated since they will not affect the function of the diaphragm.

Referring now to FIG. 4, there is illustrated a typical application as, for example, in a foundry molding machine. In such application there is utilized two lubricating distributing valves arranged in tandem to service, for example, five machine components or areas requiring lubrication. Such valves indicated at 60 and 61 are identical in form to the valve 10 seen in FIGS. 1 through 3 with the exception of connections to the tapped ports 18 in the passages 16 and 17. The lower or lubricant passage in each valve body is interconnected by coupling 62 while the upper passage 16 in each valve cap is interconnected by coupling 63. A plug 64 is provided in the passage 16 of the cap of valve 61 while the passage 16 in the cap of valve 60 is connected through union 65 to air line 66 in turn connected to air line 67 which is connected to one of the ports of four-way operating valve 68.

The passage 17 in the body of the valve 61 is connected at one end to gravity fill oil or lubricant line 70 in turn connected to tank 71 which may be mounted on the machine column. Such tank has a fill opening 72 and a sight gauge 73. The passage 17 in the body of valve 60 opposite the coupling 62 is provided with a plug 74.

In the illustrated application one of the oil outlet ports of the distributor valve 60 is plugged as seen at 75 and only five of the six possible lubricating outlets are utilized. The line 76 may, for example, be employed to lubricate the jolt mechanism of the machine, while the line 77 is employed to lubricate the table. Lines 78, 79 and 80 may be employed to lubricate the squeeze mechanism. It will be appreciated that lubrication may be provided to any point in the machine with the disclosed lubricant distributing valve, and that additional valves may be employed either in series or parallel.

The four-way valve 68, may for example, be the draw control valve of the machine which normally shifts near the end of the machine cycle of operation. In its illustrated position, the line 67 and thus the passages 16 in the caps of the valves 60 and 61 are connected to atmosphere or vented through vent line 82. When the valve 68 shifts to perform its function, the source of air under pressure 83 will be connected to the passages 16 of the lubricating valves 60 and 61 in tandem causing them to force oil through the check valves 49 through the lines 76 through 80 to the desired lubrication locations. When the valve 68 has completed its function and shifts back to the position shown, the springs beneath the diaphragms in the lubricating valves will cause the diaphragms to return to their planar position pumping oil from the tank 71 to be dispensed on the next cycle of operation of the machine.

It can now be seen that there is provided a highly simplified and economically constructed and installed lubricating system for machinery and particularly for machinery which operates in contaminated environments.

We, therefore, particularly point out and distinctly claim as our invention:

1. A lubricator for machinery including a distributor device having at least one distribution line leading therefrom, a diaphragm in said distributor device, an air chamber on one side of said diaphragm and a lubricant chamber on the other side of said diaphragm, and stop means to limit diaphragm movement, said stop means including two opposed outwardly projecting members on each side of said diaphragm adapted alternately to engage shoulders in said air chamber and said lubricant chamber in accordance with the pressure in said air chamber, whereby when said air chamber is pressurized a predetermined quantity of lubricant is forced by the diaphragm from said lubricant chamber through said distribution line.

2. A lubricator as set forth in claim 1 wherein said distributor device includes a cap and block secured together with said diaphragm therebetween, an air passage in said cap and a lubricant passage in said block, each connected by a transverse passage to the respective chamber.

3. A lubricator as set forth in claim 1 including a machine control valve operative alternately to pressurize and vent said air chamber.

4. A lubricator for machinery including a distributor device having at least one distribution line leading therefrom; a diaphragm in said distributor device; said distributor device including a cap and block secured together with said diaphragm therebetween; an air passage in said cap and a lubricant passage in said block; a plurality of paired air and lubricant chambers on opposite sides of said diaphragm, each being connected by a transverse passage to said air and lubricant passages in said cap and block, respectively, with each lubricant chamber communicating with a distribution line during pressurization of said air chamber; and stop means to limit diaphragm movement, whereby when said air chambers are pressurized a predetermined quantity of lubricant is forced by said diaphragm from said lubricant chambers through said distribution line.

5. A lubricator as set forth in claim 4 including a compression spring in each lubricant chamber operative to return said diaphragm to a planar condition when said passage in said cap is vented.

6. A lubricator as set forth in claim 5 including a check valve in each transverse passage between the respective lubricant chamber and the lubricant passage in said block restricting flow of lubricant from the chamber to the lubricant passage.

7. A lubricator as set forth in claim 5 including a lubricant outlet passage for each lubricant chamber, and a check valve in each outlet passage restricting lubricant flow from the outlet passage to the chamber.

8. A lubricator as set forth in claim 4 including a machine control valve operative alternately to pressurize and vent said air passage.

9. A lubricator for machinery including a distributor device having at least one distribution line leading therefrom; a diaphragm in said distributor device; an air chamber on one side of said diaphragm and a lubricant chamber on the other side of said diaphragm; stop means to limit diaphragm movement including two opposed outwardly projecting members on each side of said diaphragm adapted alternately to engage shoulders in said air and lubricant chambers in accordance with the pressure in said air chamber; and a spring in said lubricant chamber to urge said diaphragm to a planar condition with said projecting member in said air chamber engaging the shoulder therein, said spring being centered by a shaft connected at one end to the projecting member in said lubricant chamber; whereby when said air chamber is pressurized a predetermined quantity of lubricant is forced by the diaphragm from said lubricant chamber through said distribution line.

* * * * *